United States Patent

Nallagonda et al.

(10) Patent No.: US 9,852,288 B2
(45) Date of Patent: Dec. 26, 2017

(54) SECURING DATA ON A COMPUTING SYSTEM

(71) Applicant: Tata Consultancy Services Limited, Mumbai (IN)

(72) Inventors: Harshita Vani Nallagonda, Madhapur Hyderabad (IN); Sitaram Venkata Chamarty, Madhapur Hyderabad (IN); Lakshmi Padmaja Maddali, Madhapur Hyderabad (IN); Praveen Gauravaram, Hyderabad (IN); R. Vigneswaran, Madhapur Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 117 days.

(21) Appl. No.: 14/616,408

(22) Filed: Feb. 6, 2015

(65) Prior Publication Data

US 2016/0132687 A1 May 12, 2016

(30) Foreign Application Priority Data

Nov. 11, 2014 (IN) .......................... 3560/MUM/2014

(51) Int. Cl.
*G06F 21/62* (2013.01)
*G06F 21/53* (2013.01)

(52) U.S. Cl.
CPC ...... *G06F 21/53* (2013.01); *G06F 2221/2113* (2013.01)

(58) Field of Classification Search
CPC .......................... G06F 2221/2113; G06F 21/53
(Continued)

(56) References Cited

U.S. PATENT DOCUMENTS

| 2003/0100964 A1* | 5/2003 | Kluge | G05B 19/042 700/83 |
| 2009/0037871 A1* | 2/2009 | Blum | G06F 8/36 717/101 |

(Continued)

OTHER PUBLICATIONS

Bugiel, Sven, et al., "Practical and Lightweight Domain Isolation on Android", In Proceedings of the 1st ACM Workshop on Security and Privacy in Smartphones and Mobile Devices, SPSM 11, pp. 5162, 2011, (Oct. 17, 2011), 12 pgs.

(Continued)

*Primary Examiner* — Kambiz Zand
*Assistant Examiner* — Aubrey Wyszynski
(74) *Attorney, Agent, or Firm* — Schwegman Lundberg & Woessner, P.A.

(57) ABSTRACT

The present subject matter relates to securing data on a computing system. In an example, a request to execute an application instance of the application is received. After receiving the request a role to be associated with the application instance may be identified based on one of user inputs, an object-role mapping, and a set of rules. Further, the application is executable in a plurality of application instances and the role of the application instance is indicative of a nature of activity to be performed in the application instance. The identified role is then associated with the application instance. Based on the role, data pertaining to the application instance may be stored in a memory location allocated to the role of the application instance. Further, each role has a dedicated memory location.

20 Claims, 4 Drawing Sheets

(58) Field of Classification Search
USPC .......................................................... 726/27
See application file for complete search history.

(56) References Cited

U.S. PATENT DOCUMENTS

| | | | | |
|---|---|---|---|---|
| 2009/0133100 | A1* | 5/2009 | Buchwald | G06F 21/6218 726/3 |
| 2010/0106812 | A1* | 4/2010 | Bernabeu-Auban | H04L 41/0806 709/221 |
| 2010/0161082 | A1* | 6/2010 | Ebrom | G05B 15/02 700/17 |
| 2010/0299631 | A1* | 11/2010 | Chow | G06Q 10/06 715/806 |
| 2012/0323717 | A1* | 12/2012 | Kirsch | G06Q 20/0855 705/26.1 |

OTHER PUBLICATIONS

Guo, Tao, et al., "Enforcing Multiple Security Policies for Android System", 2nd International Symposium on Computer, Communication, Control and Automation (3CA 2013), 165-169, (2013), 165-169.

Ni, Xudong, et al., "DiffUser: Differentiated User Access Control on Smartphones", In MASS, pp. 1012-1017, IEEE, 2009, (2009), 1012-1017.

Rohrer, Felix, et al., "DR BACA: Dynamic Role Based Access Control for Android", Charles N. Payne Jr. editor, ACSAC, 2013, pp. 299-308, ACM, (2013), 299-308.

Rohrer, Felix, et al., "POSTER: Role Based Access Control for Android (RBACA)", Annual Computer Security Applications Conference (ACSAC), 2012, (2012), 2 pgs.

Russello, Giovanni, et al., "MOSES: Supporting Operation Modes on Smartphones", In Proceedings of the 17th ACM Symposium on Access Control Models and Technologies SAC- MAT 12, 2012, pp. 3-12, New York, NY, USA, ACM, (2012), 3-12.

Thomas, R. K., et al., "Task-based Authorization Controls (TBAC): A Family of Models for Active and Enterprise-oriented Authorization Management", Proceedings of the IFIP WG11.3 Workshop on Database Security, Lake Tahoe, California, Aug. 11-13, 1997, (Aug. 1997), 16 pgs.

Wang, Rui, "Unauthorized Origin Crossing on Mobile Platforms: Threats and Mitigation", Ahmad-Reza Sadeghi, Virgil D. Gligor, and Moti Yung, editors, ACM Conference on Computer and Communications Security, 2013, pp. 635-646, ACM, (2013), 635-646.

* cited by examiner

SECURING DATA ON A COMPUTING SYSTEM

TECHNICAL FIELD

The present subject matter relates, in general, to data security, and in particular to securing data on a computing system.

BACKGROUND

Individuals and enterprises use computing systems and applications extensively to generate and exchange digital data for organizing their activities effectively and efficiently. Different applications used by the individuals and enterprises may include, but are not limited to, word processors, web browsers, portable document format viewers, multimedia applications, and email clients. Data presented to or available from the different applications may include data that is private to a user, for example, usernames, passwords, credit/debit card details, bank account details, data relating to financial transactions, contacts, electronic mails, photos, and official data that may be present on the computing system.

Attacks which exploit vulnerabilities of the computing system's application or platform expose the data stored in the computing system to an attacker that may lead to data security risk. Data security risk includes data exfiltration and data loss. Data exfiltration includes unauthorized copying, transfer, or retrieval of data from the computing system. Therefore, exfiltration of the data may lead to consequences, such as identity theft, financial and non-financial risks, and reputation damage to the individuals and enterprises. Further, data on being exposed to the attacker may be removed from the computing system by the attacker which may cause loss of the data from the computing system leading to data loss. Hence, the data is secured in order to guard the computing system from the data security risk.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components. Some embodiments of system(s) and/or method(s), in accordance with embodiments of the present subject matter, are now described by way of example only, and with reference to the accompanying figures, in which.

DETAILED DESCRIPTION

Figure 1:
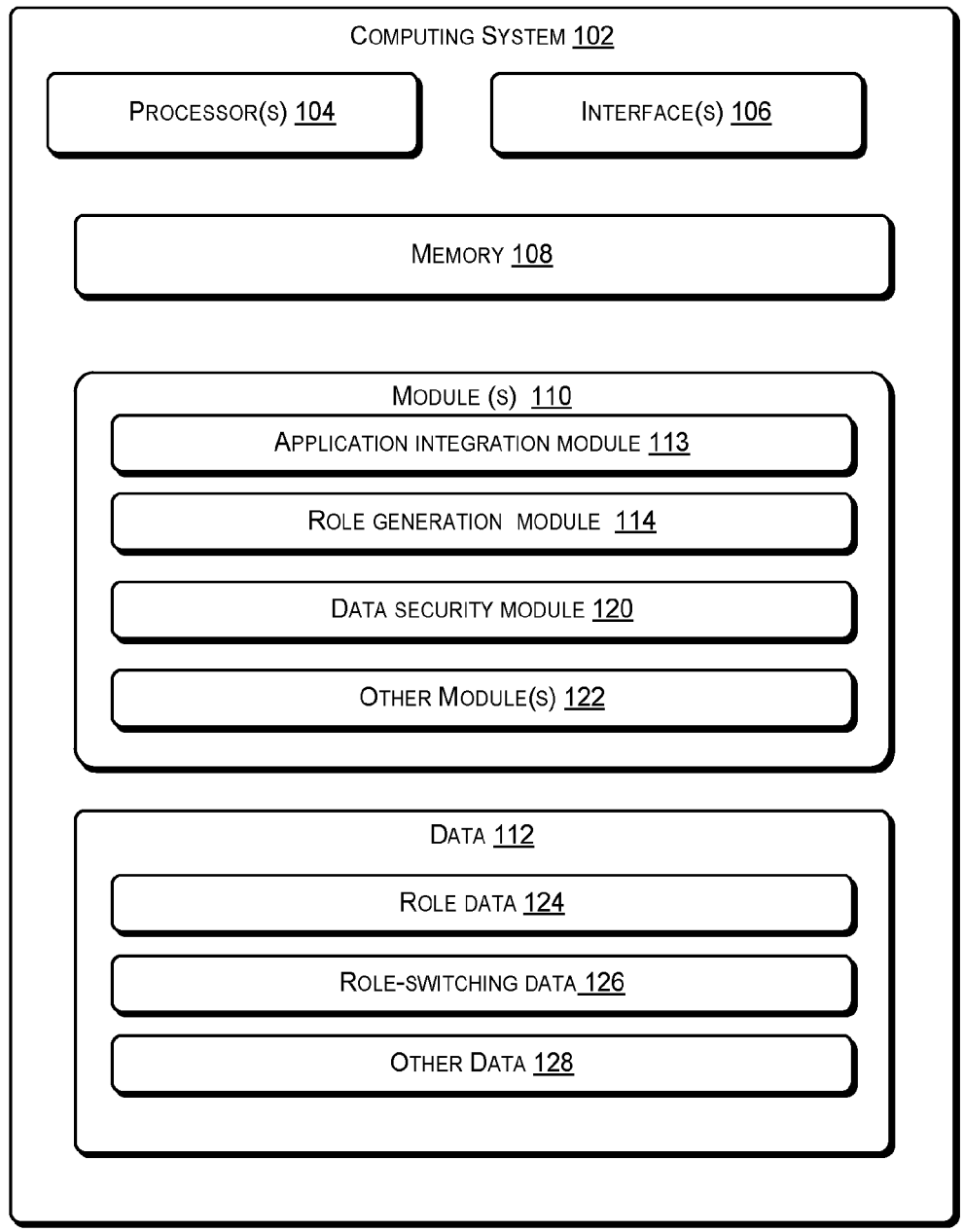
FIG. 1 illustrates a computing system, in accordance with an implementation of the present subject matter.

The present subject matter relates to securing data pertaining to applications in a computing system, for example, a laptop, a desktop, a smart phone, and a tablet.

The data pertaining to the applications may include, but are not limited to, usernames, passwords, credit/debit card details, bank account details, data relating to financial transactions, contacts, photos, contents of electronic mails, search strings, and different documents accessed by the user.

Malicious attacks may include, but are not limited to, cross-site request forgery and session or cookie hijacking that exploit application or platform vulnerabilities, such as buffer overflows and improper input validation. These malicious attacks lead to data security risk in the computing system. The data security risk is particularly high when computing systems are shared by multiple users. For example, a computing system, such as a desktop and a laptop, may be used by more than one user. In such systems, the data pertaining to one user is isolated from the data pertaining to another user to reduce the data security risk. For example, a user may inadvertently execute a malicious action, such as click on a malicious URL, access a malicious website, open a malicious email, or open a malicious document. As a result, the application executing the malicious action encounters a malicious attack. In the example, say, a web browser application encounters the malicious attack. This may provide the attacker access to the data pertaining to the user who is running the web browser application, but may not provide access to data of other users since the user data is isolated. Therefore, the data security risk is reduced to the data of a single user.

However, as various computing devices are increasingly being used for handling private and official data, data security risk of a single user also has to be reduced further. Typically, in a computing system, such as a smart phone, an advanced Operating System based computing system, and a tablet, in order to further reduce the data security risk to data pertaining to the application that has encountered the malicious attack, the data pertaining to the application is stored in a memory location allocated to the application. Further, the memory location allocated to the application is isolated from that of other applications. For example, a user may execute a portable document format (pdf) viewer application to view a pay-slip which contains data, such as bank account number, salary of the employee, and social security or permanent account number of the employee. Simultaneously, while executing the pdf viewer application, the user may also execute a web browser application. In this scenario, if the user, for example, clicks on a malicious link in the web browser application, then the data pertaining to the web browser application as well as other applications of the user, which includes the pdf viewer application, may be exposed to the attacker. In order to prevent this, the memory location allocated to the web browser application is separated from the memory location allocated to the pdf viewer application. As a result, the web browser application cannot access the data relating to the pdf viewer application unless the user allows it. Thus, when the web browser application encounters the malicious attack, the data relating to the pdf viewer application is prevented from being exposed to the attacker. Hence, the data security risk is limited to the application that has encountered the malicious attack. However, many times, a user may allow applications to access data related to other applications without being aware of the data security risk.

Moreover, a single application, such as a word processor, a web browser, a portable document format (pdf) viewer, or an email client, may be used to perform different kinds of activities. For example, an instance of a web browser application may be used to access a social networking website and another instance of the web browser application may be used to access an online net-banking portal. Therefore, the data pertaining to the web browser application may include private data of a user, such as customer identification number and Bank Pin Code, relating to the net-banking portal, as well as other data pertaining to other instances of the web browser application. Hence, if the instance of the web browser application accessing the social networking website encounters the malicious attack, other data pertaining to the web browser application, including the private data of the user pertaining to the net-banking portal also gets exposed to the attacker. Therefore, the attacker may obtain net-banking credentials of the user and may be in a position to gain access to the user's net-banking account and thereby may perform undesirable transactions or even alter the user's credentials leading to identity theft and financial risk to the user. Therefore, segregating the data pertaining to different applications does not protect against data security risk that may be encountered by different instances of the same application.

The present subject matter relates to systems and methods to secure data pertaining to applications in a computing system. According to an example of the present subject matter, securing data pertaining to applications in a computing system, such as a desktop, a laptop, a smart phone, and a tablet, is based on a role associated with an instance of the application. A role may be an indicative category in which the instance of the application is executed. The role may be used to limit access to data pertaining to a specific use of the application. For example, one instance of a web browser application may be used to access an online shopping website, another instance of the web browser application may be used to access a railway ticket reservation portal, and yet another instance of the web browser application may be used to access a social networking website. In the example, each instance of the web browser application corresponds to a different use of the application and therefore may be associated with a separate role. In another example, some of the uses of the application, such as online shopping and railway ticket reservation, may be associated with the same role while other uses, such as social networking, may be associated with another role.

In an example of the present subject matter, each role has a dedicated memory location such that the data pertaining to that role cannot be accessed by applications in other roles. Thus in the present subject matter, data isolation is based on roles in which the application may be used. Hence, even if one role associated with one instance of the application encounters the malicious attack, the data pertaining to the other roles associated with other instances of the same application is not exposed to an attacker. Thus, the data security risk is limited to the specific role that has encountered the malicious attack. As a result, data isolation between two roles of the same application may be achieved, thereby reducing the data security risk arising from different instances of the same application.

Further, the present subject matter also prevents loss of data pertaining to different roles of an application. In an example, data pertaining to a role of the application may be moved from the dedicated memory location of the role to a secondary memory location at pre-determined time intervals. Thus, a back-up may be created for the data pertaining to the role. Hence, in case the application instance associated with the role encounters a malicious attack the loss of the data pertaining to the role is prevented or minimized.

Moreover the present method(s) can be performed on any existing application in a computing system or on an application that is newly installed in the computing system, without any changes to the application itself. Therefore, present system(s) and method(s) seamlessly integrate with the existing system thereby allowing the use of the present technique in a wide range of computing systems, such as a desktop, a laptop, a tablet, and a smart phone.

Further, in an example of the present subject matter, while executing the application, on determining a probable data security threat to the data in the role, the role to which the application instance is associated may be switched to a new role, say a random role. Thus, the system prevents the data stored in the dedicated memory location of the role to which the application instance was associated before encountering the probable data security threat from getting exposed to the attacker. Thereby, the present system(s) and method(s) provide better data security.

Moreover, the present technique also permits the user to manage the roles flexibly. For example, a user may create a role based on the nature of activity to be performed by the application instance, or select a role that has already been created, or delete a role when data pertaining to the role is no longer desired. Thereby the present subject matter provides for flexible handling of roles by the user.

These and other advantages of the present subject matter would be described in greater detail in conjunction with the following figures. While aspects of described system(s) and method(s) to secure data pertaining to applications can be implemented in any number of different computing systems, environments, and/or configurations, the embodiments are described in the context of the following example system(s) and method(s). Although, the subsequent paragraphs describe, by way of illustration, system(s) and method(s) to secure data pertaining to applications, it may be appreciated that the system(s) and method(s) described herein may equally be applied to secure data pertaining to different computing platforms as well. Hence, the term "applications" as used hereinafter may be understood as being related to any executable computer software, including platforms, widgets, and the like.

FIG. 1 illustrates a computing system 102 to secure data pertaining to an application on the computing system 102, according to an example of the present subject matter. The computing system 102, hereinafter referred to as the system 102, may be implemented as, but is not limited to, desktop computers, hand-held devices, laptops, or other portable computers, tablet computers, and the like.

In one implementation, the system 102 includes processor(s) 104 and a memory 108. The processor(s) 104 can be a single processing unit or a number of units, all of which could include multiple computing units. The processor(s) 104 may be implemented as one or more microprocessor, microcomputers, digital signal processors, central processing units, state machines, logic circuitries, and/or any devices that manipulate signals based on operational instructions. Among other capabilities the processor(s) 104 are adapted to fetch and execute computer-readable instructions stored in the memory 108.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 106 may include a variety of software and hardware interfaces, for example, interface for peripheral device(s), such as a keyboard, a mouse, and an external memory. Further, the interface 106 may include one or more ports for connecting the system 102 with other computing devices, such as web servers, and external databases. The interface(s) 106 may facilitate multiple communications within a wide variety of protocols and networks, such as a network, including wired networks, e.g., LAN, cable, etc., and wireless networks, e.g., WLAN, cellular, satellite, etc.

The memory 108 may be coupled to the processor 104 and may include any computer-readable medium known in the art including, for example, volatile memory, such as Static Random Access Memory (SRAM) and Dynamic Random Access Memory (DRAM), and/or non-volatile memory, such as Read Only Memory (ROM), Erasable Programmable ROMs (EPROMs), flash memories, hard disks, optical disks, and magnetic tapes.

The system 102 may also include module(s) 110 and data 112. The modules 110 and the data may be coupled to the processor(s) 104. The modules 110, amongst other things, include routines, programs, components, data structures, etc., which perform particular tasks or implement particular abstract data types. The modules 110 may also be implemented as, signal processor(s), state machine(s), logic circuitries, and/or any other device or component that manipulate signals based on operational instructions.

In an implementation of the present subject matter, the modules 110 may be computer-readable instructions which, when executed by a processor/processing unit, perform any of the described functionalities. The computer-readable instructions may be stored on an electronic memory device, hard disk, optical disk, or other computer-readable storage medium or non-transitory medium. In an example, the computer-readable instructions can be also be downloaded to a storage medium via a network connection.

The modules 110 include, for example, an application integration module 113, a role generation module 114, a data security module 120, and other module(s) 122. The other module(s) 122 include programs that supplement applications or functions performed by the system 102. It may be understood that the modules 110 of the system 102 may be distributed among multiple computing systems.

The data serves, amongst other things, as a repository for storing data obtained and processed by other module(s) 122. The data 112 includes, for example, role data 124, role-switching data 126, and other data 128. The other data 128 includes data generated as a result of the execution of one or more modules in the other module(s). Although the data 112 is shown internal to the system 102, it may be understood that the data 112 may reside in an external repository (not shown in the figure), which may be coupled to the system 102.

In an implementation, role based access to data pertaining to applications may be provided and maintained by the system 102. In the system 102, an application may be used to perform a varied nature of activities. For example, an instance of a web browser application may be used to access an online net-banking portal, another instance of the web browser application may be used to access a social networking website and, yet another instance of the web browser application may be used to access an email client. Therefore, each instance of the web browser application is used to perform a particular nature of activity and access the data pertaining to that application instance. For example, data pertaining to the application instance accessing the online net-banking portal may include Customer ID and Bank PIN of the user, data pertaining to the application instance accessing the social networking website may include photos, contacts, and messages of the user, and data pertaining to the application instance accessing the e-mail client may include e-mail attachments and other e-mail contents. As may be appreciated, the data pertaining to different instances of the application may include data that is private to the user. Therefore, the data pertaining to the different application instances are to be secured from attacks, such as malicious attacks that exploit vulnerabilities of a system to access the data and thereby lead to data security risk.

According to an example of the present subject matter, the system 102 may receive a request to invoke the application integration module 113. The application integration module 113 may receive user inputs that identify an application to be integrated with the role generation module 114 for securing its data. In an example, a user interface may be provided upon invoking the application integration module 113. The provided user interface may allow a user to select, from amongst a list of supported and/or installed applications, the application to be integrated with the role generation module 114.

In another example, the user interface may be provided upon invoking an application that is pre-integrated with the role generation module 114. An application, for example, Internet Explorer or Mozilla Firefox, may be pre-integrated with the role generation module 114 by using an application wrapper. The application wrapper may be a file that includes a reference to, say, another file or directory. In an example, the application wrapper can be a symbolic link. The symbolic link, for example, may point to a target. The target that is pointed by the symbolic link can be, for example, a file, a directory, an application, a module, and the like. In an example, the symbolic link may include a text string. The text string can include, for example, a 'ln -s' command, which creates a symbolic link, in a command line interface (CLI). Thus, according to an example of the present subject matter, the text string in the symbolic link may be automatically interpreted by the operating system. The text string in the symbolic link may provide a path that directs the operating system to another module, such as the role generation module 114. Thus, the user may invoke the application pre-integrated with the role generation module 114. Upon invoking the pre-integrated application, the user interface for integration of other application(s) with the role generation module 114 may be provided. Once the other application(s) to be integrated with the role generation module 114 is identified, the application integration module 113 integrates the identified application with the role generation module 114.

Once an application is integrated with the role generation module 114, the application integration module 113 can allow the role generation module 114 to be invoked first when an application instance of the integrated application is invoked. The application integration module 113 can do this by using the application wrapper. Accordingly, when an application integrated with the role generation module 114 is invoked to execute an application instance, the role generation module 114 automatically gets invoked first to identify a role in which the application instance is to be executed.

In one implementation, the role generation module 114 allows for creation of roles. In an example, the role generation module 114 may receive one or more user inputs to create a role. The one or more user inputs may include a name for the role. Upon receiving the user inputs, the role generation module 114 will have a role-id assigned to the role, the role-id being a unique identification for the role. Once the role-id is assigned to the role, the role generation module 114 will have a dedicated memory location allocated to the role. In an example, the role generation module 114 sends a request to the operating system to create the role, assign the role-id to the role, and allocate the dedicated memory location to the role.

Accordingly, upon integration of the application with the role generation module 114, the data pertaining to application instances of the application may be managed by method(s) and system(s) described by the present subject matter. However, if the application is not integrated with the role generation module 114, default data security techniques, such as File-system permissions, application sandbox, application-level permissions model, and other access control techniques may be used for securing the data pertaining to that application. Thus, the method(s) and systems(s) present subject matter allow multiple data security techniques to be used in parallel.

Considering an example, when an application integrated with the role generation module 114 is invoked, i.e., a request to execute an application instance of the application is received; the role generation module 114 is executed to identify the role to be associated with the application instance of the application. Upon executing, the role generation module 114 may identify the role to be associated with the application instance, based on one of user inputs, an object-role mapping, and a set of rules. For example, the role generation module 114 may provide a list of pre-defined roles from which a user may identify a role to be associated with the application instance. In case the list of pre-defined roles does not comprise a role desired by the user, the user may use the role generation module 114 to create a new role and then identify the new role to be associated with the application instance.

In an example, the object-role mapping may be used by the role generation module 114 to determine the role to be assigned. An object, as used herein, can refer to a particular realization of an application, such as a file to be opened or a URL to be accessed. Thus, on execution, an application results in running of an application instance, which could correspond to either an object, i.e., a particular file or URL, or a default execution, such as a blank webpage or blank file. Further, multiple application instances of an application can be executed in parallel, for example, by opening a number of files, opening multiple URLs, etc. In case an application instance corresponds to an object, an object-role mapping may be used to determine the role in which the application instance is to be executed.

The object-role mapping may include information associating a role to a particular object, such as a pdf file, a word document, a URL, or a media file. For instance, on invoking a net-banking portal for the first time the net-banking portal may be associated, based on user inputs, with a role, say, a "banking" role. As a result, the net-banking portal may be mapped to the "banking" role. Therefore, upon accessing the net-banking portal at a later point in time, the role generation module 114, based on the object-role mapping, associates the application instance for the net-banking portal with the "banking" role.

In another example, the object-role mapping may include information associating a possibly malicious object with a pre-defined role, say, a random role. In order to associate the possibly malicious object with the random role, the role generation module 114 analyzes an object based on the role-switching data 126. The role-switching data 126 may include information pertaining to malicious objects, which include, but are not limited to, information relating to malicious URLs, untrusted documents, malicious electronic mails, malicious media files, and other malicious contents, which may prompt the computing system to execute a malicious action. Upon analysis, if the role generation module 114 determines that the object is possibly malicious, then the role generation module 114 associates the pre-defined random role with the possibly malicious object. Thus an object on being determined to be possibly malicious gets mapped to the pre-defined random role.

In another example, the set of rules may associate an object, such as a pdf file, a word document, a URL, or a media file, with a role. The set of rules may be based on a knowledgebase that comprises information associating a role with the object. The knowledgebase may be generated by gathering and analyzing information obtained from internal and/or external sources. For instance, the role generation module 114 may analyze a URL to be accessed. Based on the analysis, if the URL is a trusted secure URL, such as corporate portal, then based on the set of rules, the trusted secure URL may be associated with a role, say a "secure role". The "secure role" may be a role that may be pre-defined by the role generation module 114.

At the time of identifying, the role generation module 114 also associates a persistence attribute and a rank attribute with the role, based on one of user inputs, the object-role mapping, and the set of rules. In an example, the persistence attribute of the role may be set by a user. The persistence attribute can be used to classify the role as a permanent role or a temporary role. In another example the role generation module 114 may also set the persistence attribute based on the object-role mapping and the set of rules. The rank attribute can correspond to a hierarchical rank, as will be discussed later, and can be set in a manner similar to the persistence attribute.

Further, once the persistence attribute and the rank attribute of the role to be used for the execution of an application instance is identified, the role generation module 114 can pass control to the data security module 120 that can handle the allocation and access of memory location for the application instance. For example, based on the role id of the role, the data security module 120 can request the operating system to allocate the dedicated memory location of the role to the application instance.

In one example, if the role is a permanent role, the data security module 120 allows the data pertaining to the permanent role to persist in the memory location dedicated to the permanent role even after the execution of the application instance associated with the permanent role is complete. Whereas, if the data security module 120 identifies that the persistence attribute of the role is not set then the role is classified as a temporary role. The data security module 120 removes the data in the temporary role from the memory location dedicated to the temporary role after the execution of the application instance associated with the temporary role is complete. Therefore, depending on the persistence attribute, the role may be allowed to persist or may be deleted after the completion of an activity in the application instance. Hence, wastage of memory can be avoided.

Further, the data security module 120 may ascertain whether the rank attribute of the role, is set. When the rank attribute is set, access to the dedicated memory location of the role is provided based on a hierarchical access criteria. The hierarchical access criteria indicates that access to the dedicated memory location of the role is provided based on a hierarchical rank associated with the role. In other words, the data security module 120 can associate a hierarchical access criteria with the role, i.e., a hierarchical rank can be associated with the role. Accordingly, the data security module 120 can provide access to the memory location dedicated to the role based on the hierarchical rank. For example, the data associated with a role having a lower hierarchical rank can be made accessible to one or more other roles associated with a higher hierarchical rank. However, roles having the same hierarchical rank may not be able to access each other's data or the data of a role associated with a higher rank. On the other hand, if the data security module 120 ascertains that the rank attribute of the role is not set, then access to the dedicated memory location of the role is provided based on an absolute criteria. The absolute criteria indicates that the data in the dedicated memory location of the role is made inaccessible to one or more other roles. In other words, the absolute criteria may be associated to the role, i.e., the data security module 120 can prevent access to the dedicated memory location of the role by any other role. This may be explained further through the following example.

For example, a "pay-slip role", used to view a pay slip, and an "appraisal role", used to view an appraisal history of an employee, associated with two different instances of, say, a pdf viewer application may be identified under the absolute criteria. In this scenario, data pertaining to the "pay-slip role" is not accessible to the "appraisal role". Thereby data isolation between the two roles viz. "pay-slip role" and the "appraisal role", associated with two different instances of the same application (pdf viewer), is achieved. As a result, in case the instance of the pdf viewer application associated with the "appraisal role" encounters the malicious attack, data pertaining to the "pay-slip role" is not exposed to the attacker and hence the "pay-slip role" does not encounter the data security risk.

Now, in another example, the "pay-slip role" and the "appraisal role" may be identified under the hierarchical access criteria. The "pay-slip role" and the "appraisal role" may be associated with the same rank, based on user inputs. Further, an "employee role" may be identified under the hierarchical access criteria, the hierarchical rank of the "employee role" being higher than that of the "pay-slip role" and the "appraisal role". As a result, the data pertaining to the "pay-slip role" and the "appraisal role" is accessible to the "employee role". Whereas, the "pay-slip role" and the "appraisal role" cannot access each others' data, as they have the same hierarchical rank.

Thus, once the role is identified, the role is associated with the application instance by the role generation module 114, and upon executing the application instance associated with the role, the data pertaining to the application instance is stored in the dedicated memory location allocated to the role by the data security module 120.

As a result, in case one role of the application encounters a malicious attack, the data pertaining to other roles of the same application do not get exposed to an attacker. Consequently, the data security risk is limited to the role that encounters such attack. Thus, the data exfiltration and/or data loss from other roles associated with other instances of the same application can be mitigated, thereby providing better data security.

Further, during the execution of the application instance associated with the role, the data-security module 120 ascertains, based on the role-switching data 126, whether there is any probable data security threat to the data in the role. In an example, the role-switching data 126 may include information pertaining to malicious objects, which include, but are not limited to, information relating to malicious URLs, untrusted documents, malicious electronic mails, malicious media files, and other malicious contents which may prompt the computing system to execute a malicious action.

In case, the data security module 120 ascertains that there is a probable data security threat to the data in the role, the application instance is switched to a new role, such as a "random role". The "random role" may be pre-defined and may be identified based on the object-role mapping that includes information associating a malicious object with the pre-defined random role. Thereafter, on switching the application instance to the "random role", the data already stored in the memory location dedicated to the earlier role before the threat was ascertained and the rest of system data is prevented from being either exfiltrated or lost. Further, in an example, on ascertaining a probable data security threat, the user may be notified of such a threat that lead to switching of the application instance from the role to the "random role". Therefore, on receiving such notification the user may access the data pertaining to the application instance under threat from the memory location dedicated to the "random role".

Furthermore, the present subject matter also substantially reduces risk of loss of data pertaining to different roles. In an example, the role data 124 may include data stored in the dedicated memory location corresponding to a role. In an example, the data security module 120 moves this role data 124, i.e., the data pertaining to the role from the dedicated memory location of the role to a secondary memory location at predetermined time intervals and thereby prevents loss of data from the dedicated memory location. The secondary memory location may include, but is not limited to, hard disk drives, optical storage devices, such as CDs and DVDs, and flash memory, such as USB flash drives.

Figure 2:
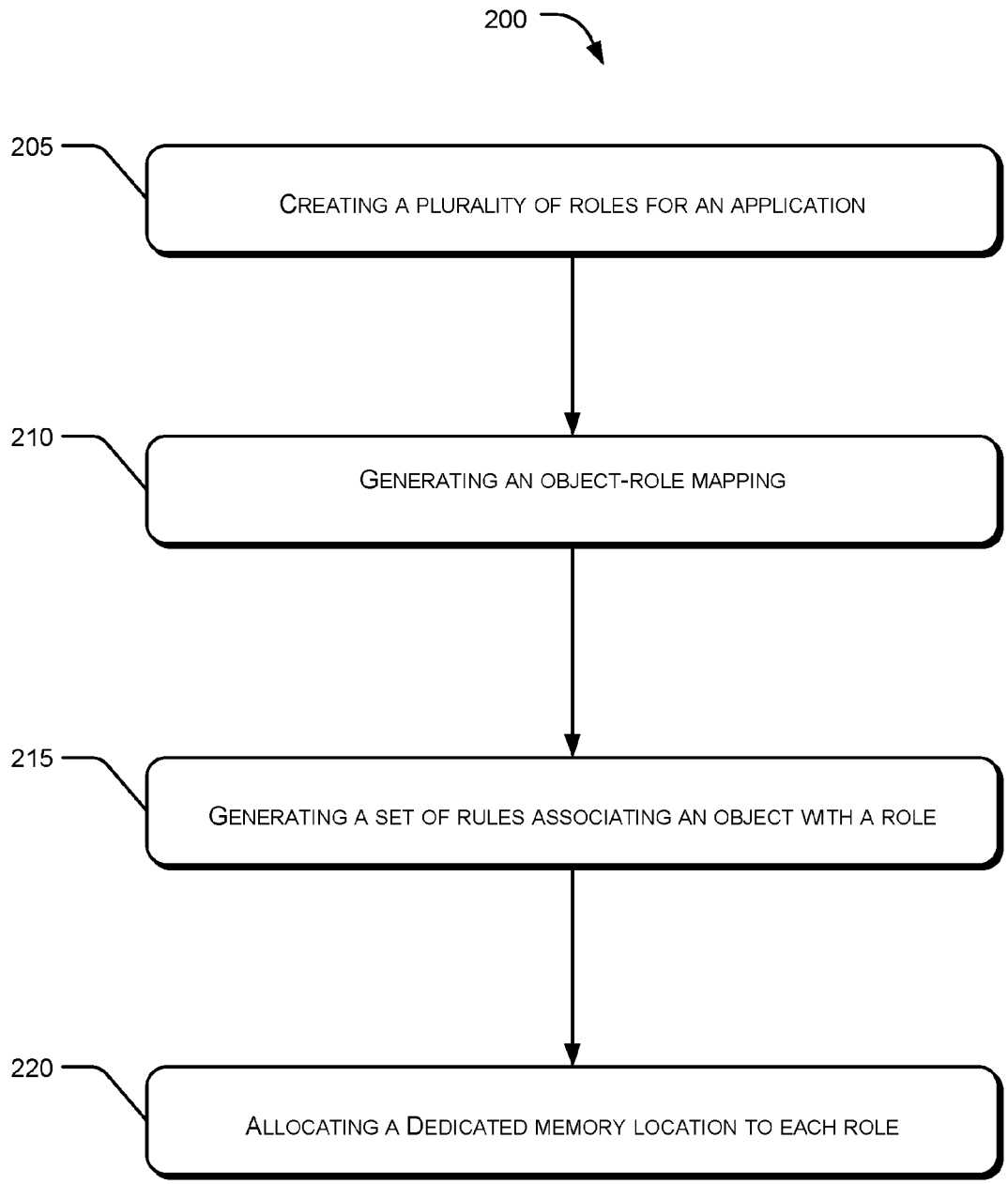
FIG. 2 illustrates a method for creating roles for an application and to manage data pertaining to the application, in accordance with an implementation of the present subject matter.

FIG. 2 illustrates a method 200 for creating roles for the application instances to manage data pertaining to the applications, in accordance with an implementation of the present subject matter. In an example, the method 200 may be performed by a computing system, such as the system 102.

The method 200 may be described in general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method 200, or an alternative method. Additionally, individual blocks may be deleted from the methods without departing from the spirit and scope of the subject matter described herein. Furthermore, the method 200 can be implemented in any suitable hardware, software, firmware, or combination thereof.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, (for example, a memory), and executes those instructions, thereby performing one or more method(s), including one or more of the method(s) described herein. Such instructions may be stored and/or transmitted using any of a variety of known computer-readable media.

FIG. 2 illustrates a method for creation of roles in accordance with an implementation of the present subject matter. Referring to FIG. 2, at block 205, in an example, a role generation module, such as the role generation module 114 may create a plurality of roles for an application based on a nature of activity performed in an application instance of the application. In an example, a user may provide one or more inputs to create a role.

At block 210, an object-role mapping may be generated by the system 102. In the example, the object-role mapping includes information associating an object, such as a pdf file, a word document, a URL, and a media file with a pre-defined role.

At block 215, the set of rules may be generated by the role generation module 114. The set of rules may associate an object, such as a pdf file, a word document, a URL, and a media file with a role based on some rules. The set of rules may be based on a knowledgebase that comprises information associating a role with the object. The knowledgebase may be generated by gathering and analyzing information obtained from internal and/or external sources.

At block 220, a dedicated memory location may be allocated to each role, from among a plurality of roles, by the role generation module 114.

Figure 3A:
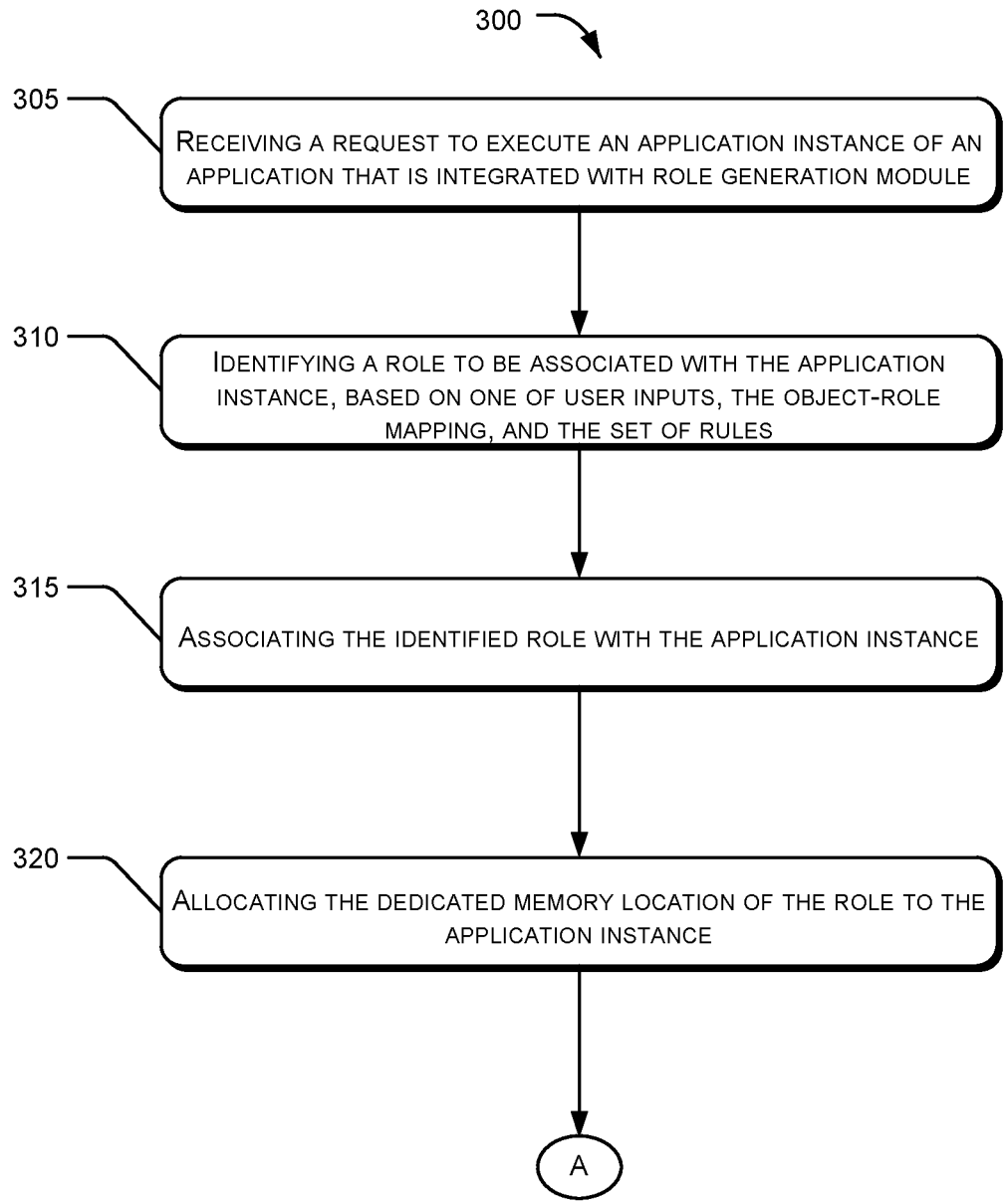
FIG. 3a illustrates a method for providing role based access to data pertaining to an application instance, in accordance with an implementation of the present subject matter.
Figure 3B:
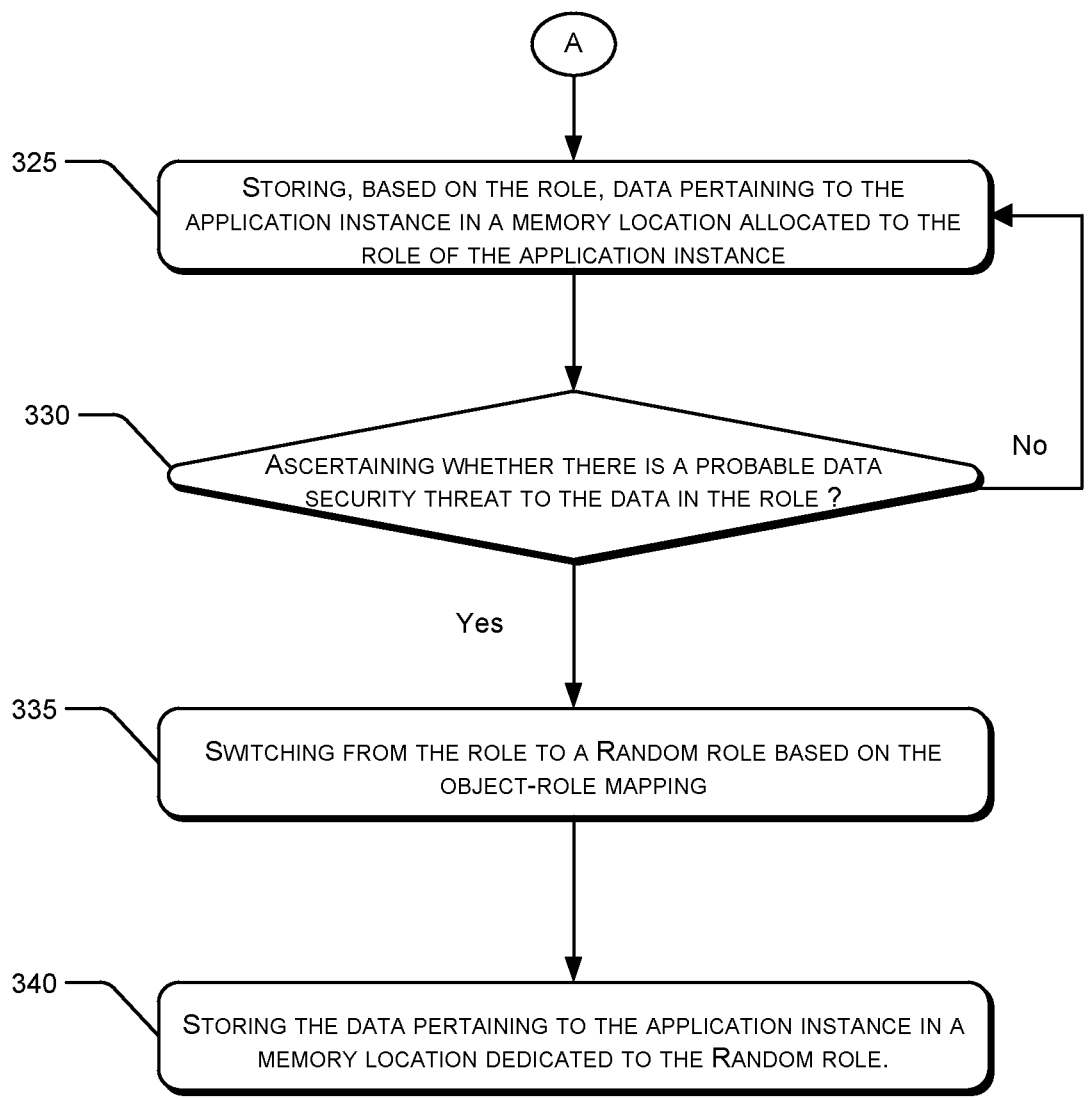
FIG. 3b is a continuation of the method illustrated in FIG. 3a for providing role based access to data pertaining to an application instance, in accordance with an implementation of the present subject matter.

FIGS. 3a and 3b illustrate a method 300 for performing role based data isolation, in accordance with an implementation of the present subject matter. In an example, the method 300 may be performed by a computing system, such as the system 102.

The method 300 may be described in general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method 300, or an alternative method. Additionally, individual blocks may be deleted from the methods without departing from the spirit and scope of the subject matter described herein. Furthermore, the method 300 can be implemented in any suitable hardware, software, firmware, or combination thereof.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, (for example, a memory), and executes those instructions, thereby performing one or more method(s), including one or more of the method(s) described herein. Such instructions may be stored and/or transmitted using any of a variety of known computer-readable media.

In an example, method 300 may be performed by a computing system, such as the computing system 102. Referring to FIG. 3a, at block 305, in an example, the computing system 102 may receive a request to execute an application instance of an application, such as a word processor application, a web browser application, and a pdf viewer application. In the example, the application may be an application that is integrated with the role generation module 114, based on user inputs received by the application integration module 113.

At block 310 the role generation module 114 may identify a role to be associated with the application instance, based on one of user inputs, the object-role mapping, and the set of rules.

At block 315, the role on being identified, is associated, by the role generation module 114, with the application instance.

At block 320, the data security module 120 can request the operating system to allocate the dedicated memory location of the role to the application instance.

Thereafter the method 300 continues to block 330 in FIG. 3b. A connector block "A" is used to denote the continuation from the block 325 in FIG. 3a to the block 330 in FIG. 3b.

At block 325, a data security module, such as the data security module 120 stores the data pertaining to the application instance in the dedicated memory location of the role allocated to the application instance.

At block 330, it is ascertained by the data security module 120 whether there is any probable data security threat to the data in the role based on the role-switching data 126. In an example, the role-switching data 126 may include information pertaining to malicious objects.

However, upon ascertaining that there is no probable data security threat to the data in the role, the process 300 may proceed to ('No') branch to the block 325.

At block 330, upon ascertaining that there is a probable data security threat, the method 300 may proceed to ('Yes' branch) to block 335, wherein the role associated with the application instance is switched to a new role, such as the random role. The random role may be identified based on the object-role mapping. The object-role mapping may include, for example, information associating a malicious object with a pre-defined role, say, the random role.

At block 340, the data pertaining to the switched application instance is stored in a memory location dedicated to the random role.

Thus, the present method(s) and system(s) provide protection to data used by each application instance performing a particular kind of activity. Thereby, the data pertaining to the each application instance can be secured under the present technique. Hence, the method(s) and the system(s) as per the present subject matter allow to substantially reduce the data security risk.

Although implementations for methods and systems for securing data in a computing system are described, it is to be understood that the present subject matter is not necessarily limited to the specific features or methods described. Rather, the specific features and methods are disclosed as implementations for securing data in the computing system.

We claim:

1. A method to secure data on a computing system, the method comprising:
receiving a request, for a user, to execute a plurality of application instances of an application, wherein the plurality of application instances are executed in parallel, and wherein each application instance of the plurality of application instances corresponds to a different use of the application;
identifying a separate role to be associated with each application instance of the plurality of application instances, for the user, based on one of user inputs, an object-role mapping, and a set of rules in a corresponding application instance, wherein the application is executable in a plurality of application instances, and wherein the role of the application instance is indicative of a nature of activity to be performed in the corresponding application instance, and wherein the role of the application instance is defined based on the different use of the application in the corresponding application instance;
associating, based on the identifying, the separate role with each application instance; and
storing, based on the role, data pertaining to the application instance in a memory location allocated to the role of the application instance, wherein each role has a separate dedicated memory location to achieve data isolation for the application instance based on the role associated with the application instance.

2. The method as claimed in claim 1, wherein the identifying further comprises, associating, based on one of the user inputs, the object-role mapping, and the set of rules, a persistence attribute and a rank attribute with the role.

3. The method as claimed in claim 2, wherein, on being classified as a permanent role based on the persistence attribute, the data pertaining to the permanent role is allowed to persist in the memory location dedicated to the permanent role after the execution of the application instance associated with the permanent role is complete.

4. The method as claimed in claim 2, wherein, on being classified as a temporary role based on the persistence attribute, the data pertaining to the temporary role is removed from the memory location dedicated to the temporary role after the execution of the application instance associated with the temporary role is complete.

5. The method as claimed in claim 2, wherein access to the dedicated memory location of the role is provided based on an absolute criteria when the rank attribute is not set, and wherein the absolute criteria indicates that the data in the dedicated memory location of the role is made inaccessible to one or more other roles.

6. The method as claimed in claim 2, wherein access to the dedicated memory location of the role is provided based on a hierarchical access criteria when the rank attribute is set, and wherein the hierarchical access criteria indicates that access to the dedicated memory location of the role is provided based on a hierarchical rank associated with the role such that data in the dedicated memory location of roles associated with a lower hierarchical rank is made accessible to one or more other roles associated with a higher hierarchical rank.

7. The method as claimed in claim 1, wherein the method further comprises:
ascertaining, based on role switching data, whether there is a probable data security threat to the data in the role, the role switching data including information pertaining to malicious objects; and
based on the ascertaining, switching, while executing the application instance, from the role to a random role, wherein, upon the switching, the data pertaining to the application instance is stored in the memory location dedicated to the random role.

8. The method as claimed in claim 1, wherein the method further comprises moving the data pertaining to the application instance from the dedicated memory location of the role to a secondary memory location at predetermined time intervals.

9. The method as claimed in claim 1, wherein the method further comprises:
creating a plurality of roles for the application, wherein each role is created based on the nature of activity performed in the application instance of the application; and
allocating a respective dedicated memory location to each of the plurality of roles.

10. A computing system to secure data, the computing system comprising:
a memory;
a processor(s);
a role generation module coupled to the processor(s) to:
receive a request, for a user, to execute a plurality of application instances of an application, wherein the plurality of application instances are executed in parallel, and wherein each application instance of the plurality of application instances corresponds to a different use of the application;
identify a separate role to be associated with each application instance of the plurality of application instances, for the user, based on one of user inputs, an object-role mapping, and a set of rules in a corresponding application instance, wherein the application is executable in a plurality of application instances, and wherein the role of the application instance is indicative of a nature of activity to be performed in the corresponding application instance, and wherein the role of the application instance is defined based on the different use of the application in the corresponding application instance; and
associate the separate role with each application instance; and
a data security module coupled to the processor(s) to,
store, based on the role, data pertaining to the application instance in a memory location allocated to the role of the application instance, wherein each role has a separate dedicated memory location to achieve data isolation for the application instance based on the role associated with the application instance.

11. The computing system as claimed in claim 10, wherein the role generation module:
identifies the role to be associated with the application instance based on one of user inputs, an object-role mapping, and a set of rules, wherein the object-role mapping indicates the role to be associated with an object; and
associates a persistence attribute and a rank attribute with the role, based on one of the user inputs, the object-role mapping, and the set of rules.

12. The computing system as claimed in claim 11, wherein the role is classified as a permanent role when the persistence attribute is set, and wherein the data security module allows the data pertaining to the permanent role to persist in the memory location dedicated to the permanent role after the execution of the application instance associated with the permanent role is complete.

13. The computing system as claimed in claim 11, wherein the role is classified as a temporary role when the persistence attribute is not set, and wherein the data security module removes the data pertaining to the temporary role from the memory location dedicated to the temporary role after the execution of the application instance associated with the temporary role is complete.

14. The computing system as claimed in claim 11, wherein the data security module provides access to the dedicated memory location of the role based on an absolute criteria when the rank attribute is not set, and wherein the absolute criteria indicates that the data in the dedicated memory location of the role is to be made inaccessible to one or more other roles.

15. The computing system as claimed in claim 11, wherein the data security module provides access to the dedicated memory location of the role based on a hierarchical access criteria when the rank attribute is set, and wherein the hierarchical access criteria indicates that access to the dedicated memory location of the role is provided based on a hierarchical rank associated with the role such that data in the dedicated memory location of roles associated with a lower hierarchical rank is to be made accessible to one or more other roles associated with a higher hierarchical rank.

16. The computing system as claimed in claim 10, wherein the data security module:
  ascertains, based on role switching data, whether there is a probable data security threat to the data in the role, the role switching data including information pertaining to malicious objects; and
  upon ascertaining that there is a probable data security threat, switches, while executing the application instance, from the role to a random role, wherein, upon the switching, the data pertaining to the application instance is stored in the memory location dedicated to the random role.

17. The computing system as claimed in claim 10, further comprising an application integration module coupled to the processor(s) to:
  identify, based on user inputs, the application to be integrated with the role generation module; and
  integrate, based on the identifying, the role generation module with the identified application.

18. The computing system as claimed in claim 10, wherein the role generation module:
  creates a plurality of roles for the application, wherein each role is created based on the nature of activity performed in the application instance of the application; and
  allocates a respective dedicated memory location, to each of the plurality of roles.

19. A non-transitory computer readable medium having embodied thereon a set of computer readable instructions that, when executed, perform a method to secure data on a computing system, the method comprising:
  receiving a request, for a user, to execute a plurality of application instances of an application, wherein the plurality of application instances are executed in parallel, and wherein each application instance of the plurality of application instances corresponds to a different use of the application;
  identifying a separate role to be associated with each application instance of the plurality of application instances, for the user, based on one of user inputs, an object-role mapping, and a set of rules in a corresponding application instance, wherein the application is executable in a plurality of application instances, and wherein the role of the application instance is indicative of a nature of activity to be performed in the corresponding application instance, and wherein the role of the application instance is defined based on the different use of the application in the corresponding application instance;
  associating, based on the identifying, the separate role with each application instance; and
  storing, based on the role, data pertaining to the application instance in a memory location allocated to the role of the application instance, wherein each role has a separate dedicated memory location to achieve data isolation for the application instance based on the role associated with the application instance.

20. The method of claim 1, wherein the object-role mapping comprises information related to associating the role to an object, wherein the object comprises a pdf file, a word document, an URL, or a media file, and the set of rules are based on the information associating the role with the object.

* * * * *